United States Patent
Oya

(10) Patent No.: US 9,288,451 B2
(45) Date of Patent: Mar. 15, 2016

(54) IMAGE PROCESSING APPARATUS AND IMAGE PROCESSING METHOD

(75) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 12/908,725

(22) Filed: Oct. 20, 2010

(65) Prior Publication Data

US 2011/0096922 A1 Apr. 28, 2011

(30) Foreign Application Priority Data

Oct. 23, 2009 (JP) ................................. 2009-244830

(51) Int. Cl.
H04N 7/18 (2006.01)
(52) U.S. Cl.
CPC ...................................... H04N 7/183 (2013.01)
(58) Field of Classification Search
None
See application file for complete search history.

(56) References Cited

U.S. PATENT DOCUMENTS

| | | | |
|---|---|---|---|
| 2004/0130620 A1* | 7/2004 | Buehler et al. ................. | 348/143 |
| 2004/0161133 A1* | 8/2004 | Elazar et al. ................... | 382/115 |
| 2004/0196369 A1* | 10/2004 | Fukasawa et al. ............. | 348/155 |
| 2005/0129272 A1* | 6/2005 | Rottman ........................ | 382/103 |
| 2005/0157169 A1* | 7/2005 | Brodsky et al. ................ | 348/143 |
| 2006/0114322 A1* | 6/2006 | Romanowich et al. ........ | 348/143 |
| 2007/0168542 A1* | 7/2007 | Gupta et al. ................... | 709/231 |

FOREIGN PATENT DOCUMENTS

| | | |
|---|---|---|
| CN | 101299274 A | 11/2008 |
| JP | 01-245395 A | 9/1989 |
| JP | 2004-062560 A | 2/2004 |
| JP | 2004-180236 A | 6/2004 |
| JP | 2008-016898 A | 1/2008 |
| JP | 2009-225398 A | 10/2009 |
| JP | 2009225398 A | 10/2009 |

* cited by examiner

Primary Examiner — Frederick Bailey
(74) Attorney, Agent, or Firm — Canon U.S.A., Inc. IP Division

(57) ABSTRACT

An object detection unit of a network camera detects an object including a human figure from image data. An event detection unit analyzes the image data based on a result of the object detection by the object detection unit. Based on a result of the image data analysis, an event detection unit determines to make identifiable to a client a human figure that should be monitored by the client and to apply masking to a human figure that should not be monitored by the client to make it unidentifiable to the client.

13 Claims, 13 Drawing Sheets

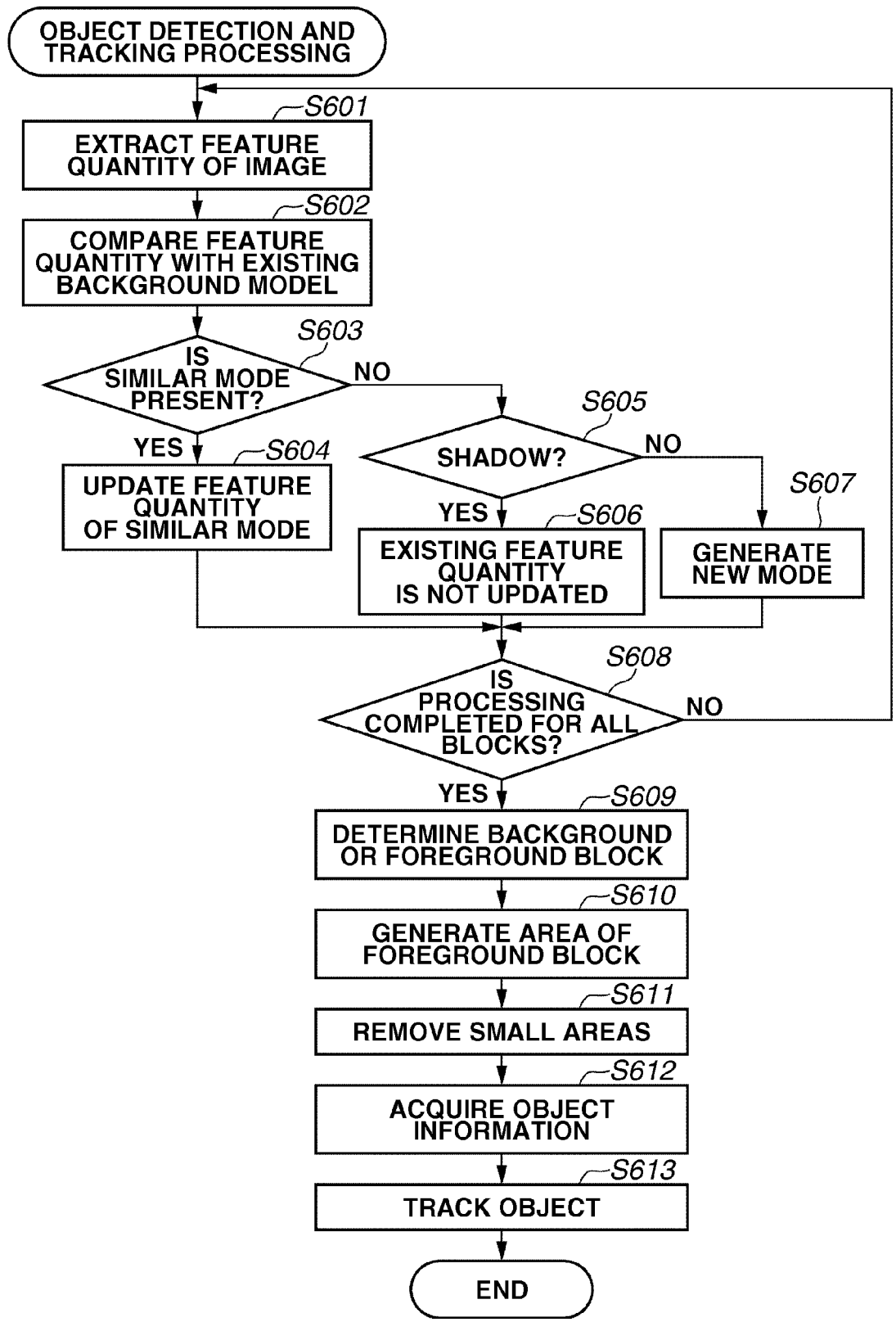

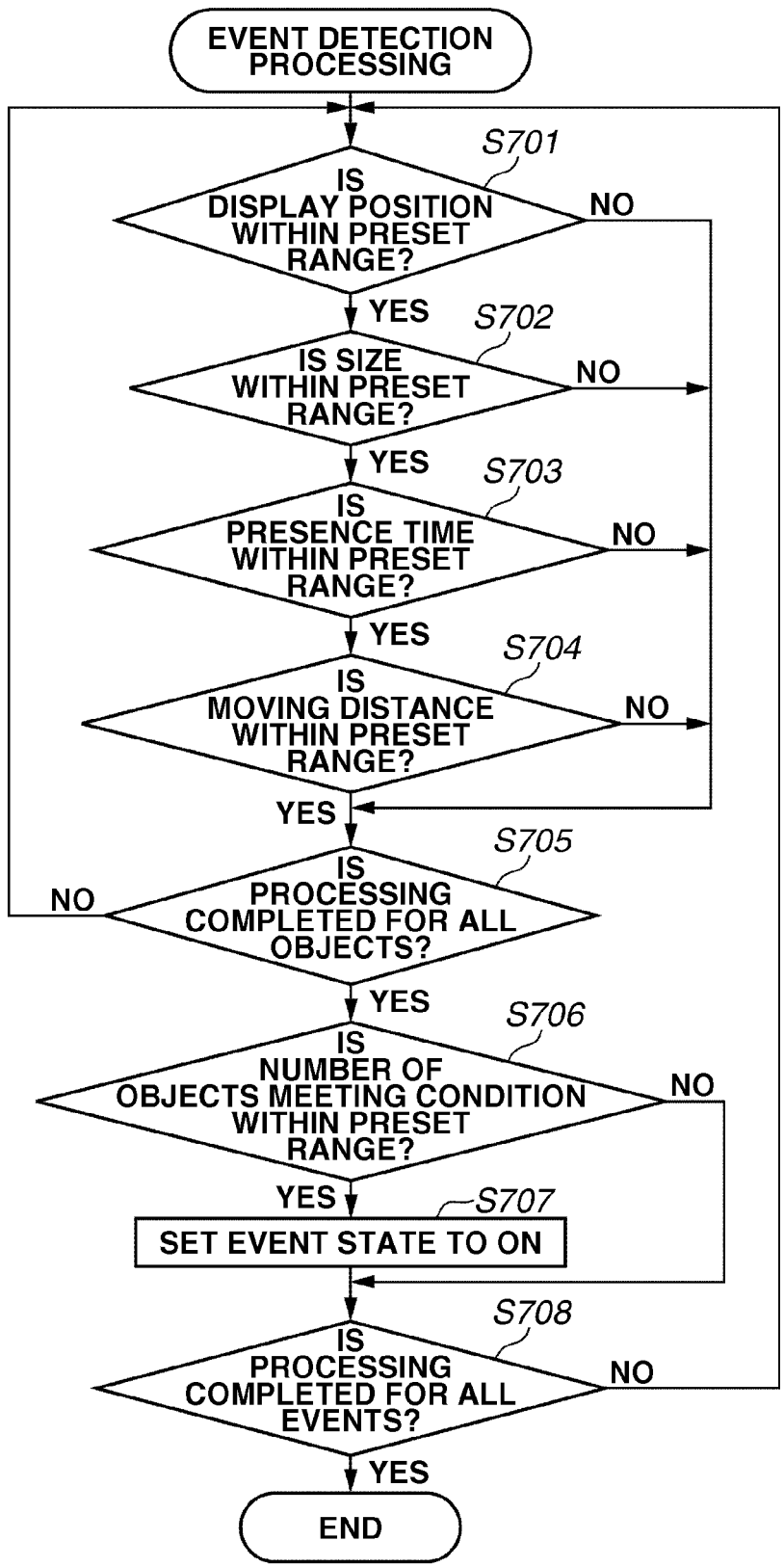

FIG.8

| ID | SETTING VALUE NAME | DESCRIPTION | EXEMPLARY VALUE |
|---|---|---|---|
| 00 | name_en | RULE NAME (ASCII) | "Abandoned Object" |
| 01 | name_jp | RULE NAME (JAPANESE) | "DESERTION" |
| 02 | enable_rule | ENABLE FLAG | 1 |
| 03 | size_min | AREA LOWER-LIMIT | 64 |
| 04 | size_max | AREA UPPER-LIMIT | 4800 |
| 05 | age_min | PRESENCE TIME LOWER-LIMIT | 240 |
| 06 | age_max | PRESENCE TIME UPPER-LIMIT | 65535 |
| 07 | trajectory_length_min | MOVING DISTANCE LOWER-LIMIT | 0 |
| 08 | trajectory_length_max | MOVING DISTANCE UPPER-LIMIT | 100 |
| 09 | objects_min | NUMBER-OF-OBJECTS LOWER-LIMIT | 1 |
| 10 | objects_max | NUMBER-OF-OBJECTS UPPER-LIMIT | 511 |
| 20 | num_region_vertex | NUMBER OF DETECTION AREA VERTEXES | 4 |
| 21 | X0 | FIRST VERTEX: X COORDINATE | 160 |
| 22 | Y0 | FIRST VERTEX: Y COORDINATE | 120 |
| 23 | X1 | SECOND VERTEX: X COORDINATE | 480 |
| 24 | Y1 | SECOND VERTEX: Y COORDINATE | 120 |
| 25 | X2 | THIRD VERTEX: X COORDINATE | 160 |
| 26 | Y2 | THIRD VERTEX: Y COORDINATE | 360 |
| 27 | X3 | FOURTH VERTEX: X COORDINATE | 480 |
| 28 | Y3 | FOURTH VERTEX: Y COORDINATE | 360 |

FIG.12

| ID | IDENTIFIER | DESCRIPTION | DATA FORMAT |
|---|---|---|---|
| 10 | M_FrameInfo | FRAME METADATA | 0xFFFA |
| 11 | M_FrameNum | FRAME No. | N (INTEGER) |
| 12 | M_FrameTime | FRAME TIME | YYYYMMDD:HHMMSS:MS |
| 13 | M_FrameDim | OBJECT COORDINATE SPACE DIMENSIONS (X × Y) | X,Y |
| | | | |
| 20 | M_ObjInfo | OBJECT METADATA | 0xFFFB |
| 21 | M_ObjNum | NUMBER OF OBJECTS | N (INTEGER) |
| 22 | M_ObjSize | SIZE (NUMBER OF BLOCKS) | N (INTEGER) |
| 23 | M_ObjRect | CIRCUMSCRIBED RECTANGLE | X0,Y0,X1,Y1 |
| 24 | M_ObjPoint | REPRESENTATIVE POINT | Xc,Yc |
| 25 | M_ObjAge | PRESENCE TIME | N (INTEGER) |
| 26 | M_ObjTrajectoryLength | MOVING PATH LENGTH | N (INTEGER) |
| 27 | M_ObjMotion | MOTION | Vx,Vy |
| 28 | M_ObjType | OBJECT IDENTIFICATION RESULT | "Human", "Car", "Object" "Unknown" |
| | | | |
| 30 | M_ObjMaskInfo | OBJECT MASKING | 0xFFFC |
| 31 | M_ObjMaskFormat | COMPRESSION METHOD | RAW |
| 32 | M_ObjMask | OBJECT MASKING | (PATTERN OF Wf × Hf BYTES) |

FIG.13

```
<?xml version="1.0"encoding="UTF-16"?>
<metadata>
<frame_metadata>
   <frame_number>
      1234567890
   </frame_number>
   <time_stamp>
      2008/01/01:1:23:45
   </time_stamp>
      <x_size>80</x_size>
      <y_size>60</y_size>
      <num_of_object>2</num_of_object>
</frame_metadata>
<object>
   <size>30</size>
   <bounding_box>10,15,20,30</bounding_box>
   <represantive_point>15,20</represantive_point>
   <age>300</age>
   <traj_length>200</traj_length>
   <motion>20.2</motion>
   <type>"Object"</type>
</object>
<object>
   <size>100</size>
   <bounding_box>30,10,50,60</bounding_box>
   <represantive_point>40,25</represantive_point>
   <age>100</age>
   <traj_length>10</traj_length>
   <motion>-20,5</motion>
   <type>"Human"</type>
</object>
<object_mask>
   <codec>raw</codec>
   <mask>*binary-data*</mask>
</object_mask>
</metadata>
```

IMAGE PROCESSING APPARATUS AND IMAGE PROCESSING METHOD

BACKGROUND OF THE INVENTION

1. Field of the Invention

The present invention relates to a technique for applying change processing such as masking and encryption to an object detected in an image.

2. Description of the Related Art

In monitoring systems aiming at abnormal condition observation and criminal prevention of facilities, the use of network cameras for distributing a captured image to a network is increasing. Accordingly, increasing number of network cameras have been installed in public facilities and streets. For example, network cameras are used for advertisement of tourist sites and leisure facilities. These exemplary applications entail privacy protection suitable for a target for disclosing an image.

Japanese Patent Application Laid-Open No. 2004-180236 discusses a technique including: regularly masking an image in an area subjected to privacy protection by changing (or processing) the relevant image signal; and canceling the processing, for example, in the event of fire.

However, when an object relevant to a detected event is to be displayed with the change processing not applied, there may be a situation that the object relevant to the detected event cannot be observed.

For example, the change processing is regularly applied to each of a plurality of human figures in the screen. When carry-away is detected, the change processing is canceled only for a human figure that performed carry-away and the privacy of other human figures are protected. However, if the human figure that performed carry-away cannot be identified, a human figure relevant to the event cannot be observed.

Further, when it takes time since an event occurs until the occurrence of the event is detected, there may be a situation that an object relevant to the event cannot be observed even after the change processing has been canceled in response to the event detection.

For example, when desertion of an object is detected, if a human figure relevant to the desertion (a human figure that performed desertion) has already gone out of the screen, the human figure relevant to the detected event (desertion) cannot be observed.

Further, for example, when carry-away of an object is detected, if a human figure relevant to the carry-away (a human figure that performed carry-away) has already gone out of the screen, the human figure relevant to the detected event (carry-away) cannot be observed.

SUMMARY OF THE INVENTION

The present invention is directed to improving the possibility that an object relevant to a detected event can be observed.

According to an aspect of the present invention, an image processing apparatus for transmitting image data to a client includes: a detection unit configured to detect an unidentifiable object that should be made unidentifiable to the client from the image data; an analysis unit configured to analyze the image data; a processing unit configured to apply change processing to the unidentifiable object detected by the detection unit to make it unidentifiable to the client; and a determination unit configured to determine to make identifiable to the client an unidentifiable object under monitoring that should be monitored by the client based on a result of the image data analysis by the analysis unit, wherein an unidentifiable object not under monitoring is made unidentified to the client by the change processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates object detection and tracking processing based on a background difference.

FIG. 7 illustrates event detection processing.

FIG. 8 illustrates an exemplary setting of an object state determination rule for event detection.

FIG. 12 illustrates a table describing the contents of metadata.

FIG. 13 illustrates an exemplary metadata described in the XML format.

DESCRIPTION OF THE EMBODIMENTS

Various exemplary embodiments, features, and aspects of the invention will be described in detail below with reference to the drawings.

Configurations illustrated in the following exemplary embodiments are to be considered as an example, and the present invention is not limited thereto.

The present exemplary embodiment will be described below based on a system which applies masking to a specific human figure area in an image and distributes the image to a client (a viewer and a recording apparatus). In the present exemplary embodiment, when a network camera detects an abnormal condition (event) in an image, the network camera transmits to the client the image data in which the change processing is canceled as to a human figure relevant to the event. The change processing refers to, for example, masking (mosaic, blur, etc.) and encryption. The present exemplary embodiment will be described below based on the masking processing. Events (abnormal conditions) to be detected include, for example, invasion to a prohibition area, desertion and carry-away of an object, as well as prowl.

Figure 1:
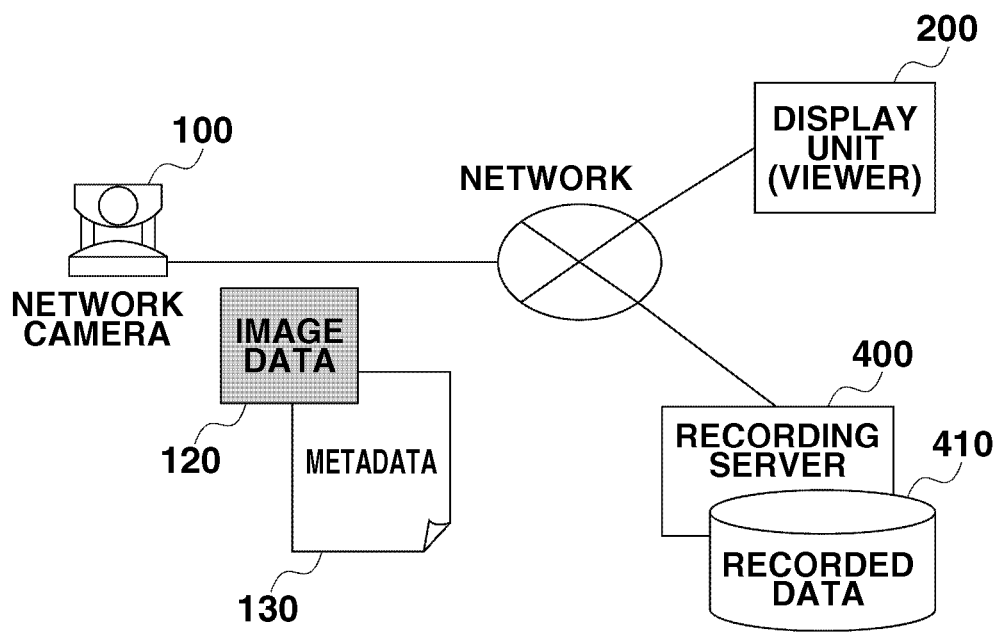
FIG. 1 illustrates a system configuration of an exemplary embodiment.

A system configuration according to the present exemplary embodiment is illustrated in FIG. 1. A monitoring system according to the present exemplary embodiment includes a network camera 100, a display unit (viewer) 200, and a recording server (recording apparatus) 400 connected with each other via a network. In the present exemplary embodiment, the display unit 200 and the recording server 400 serve as a client which receives image data from the network camera 100. The network camera 100 is provided with a function to detect an object and a function to detect the occurrence of an event based on a result of the object detection. The network camera 100 distributes image data 120 and metadata 130 to the display unit 200 and the recording server 400. The metadata 130 includes object information and event information. The object information refers to, for example, at least any one of the display position, area, circumscribed rectangle, presence time, moving distance (moving path length) of a detected object, and masking state (whether or not masking is applied). The event information notifies that an event (abnormal condition) has occurred. The metadata 130 may be appended to the image data 120. The image data 120 and the metadata 130 may be distributed in different streams.

The display unit 200 receives the image data 120 and the metadata 130, and displays an image based on the image data 120. In addition, the display unit 200 can superimpose the object information such as an object frame onto the displayed image. Further, depending on the event information, the display unit 200 sounds an alarm to notify a user of the occurrence of an event. The recording server 400 stores the image data 120 and the metadata 130.

Configurations of the network camera 100 and the display unit 200 in the present exemplary embodiment will be described below with reference to FIG. 2. The network camera 100 includes an imaging unit 101, an image protection unit 102, an encoding unit 103, an image transmission unit 104, an object detection unit 105, an event detection unit 106, and a communication interface unit 110.

The imaging unit 101 includes an optical system, an image sensor, and an A/D conversion function to acquire image data. The imaging unit 101 transmits the acquired image data to the object detection unit 105. The object detection unit 105 detects an object in the received image data. The object detection unit 105 determines whether the detected object is a human figure with reference to an object identification database (not illustrated). However, the object detection unit 105 is capable of not only detecting whether the detected object is a human figure but also classifying the object into a number of types. The object detection unit 105 in the present exemplary embodiment recognizes an object determined to be a human figure, among detected objects, as an unidentifiable object that should be made unidentifiable to the client.

The object detection unit 105 associates the detected object with an object detected in a preceding frame. This processing is referred to as tracking processing. For example, the object detection unit 105 associates human figures detected in adjacent frames, having almost the same display position and circumscribed rectangle, as an identical human figure. Specifically, the object detection unit 105 associates a plurality of detected objects based on their respective display areas.

The tracking processing performed by the object detection unit 105 includes object detachment and integration processing. For example, when the object detection unit 105 detects that a plurality of objects detected in a first frame is detached from one object detected in a second frame which precedes the first frame, the object detection unit 105 associates the plurality of objects detected in the first frame with the one object detected in the second frame. Further, when the object detection unit 105 detects that one object detected in a first frame is integration of a plurality of objects detected in a second frame which precedes the first frame, the object detection unit 105 associates the one object detected in the first frame with the plurality of objects detected in the second frame. Also in the object detachment and integration processing, the detected objects are associated with each other based on their respective display areas. The object detection unit 105 stores a history of the detected objects and association of the objects in an object history database (not illustrated).

The event detection unit 106 analyzes the image data based on a result of the object detection by the object detection unit 105 to detect an event such as desertion and carry-away. Then, the event detection unit 106 determines to make identifiable to the client an object under monitoring that should be monitored by the client, among unidentifiable objects (human figures) relevant to a specific event. Then, the event detection unit 106 notifies the image protection unit 102 of the display position information of an unidentifiable object (human figure) not under monitoring to apply masking to the object to make it unidentifiable to the client. Applying masking (change processing) to a human figure can make the human figure unidentifiable to a user monitoring on the client (display unit) side and also to the human figure identification processing by the display unit.

For example, when an object detached from a certain object, having a short moving path length (moving distance), exists in the screen for more than a predetermined time duration, the event detection unit 106 detects the event of desertion. The event detection unit 106 notifies the image protection unit 102 of the display position information of an object irrelevant to the detected event, among objects (unidentifiable objects) determined to be a human figure by the object detection unit 105. On the other hand, the event detection unit 106 does not notify the image protection unit 102 of the display position information of an unidentifiable object relevant to the detected event (an object under monitoring).

The image protection unit 102 applies masking to the display position corresponding to the display position information notified by the event detection unit 106. More specifically, the image protection unit 102 applies the change processing (masking) to the unidentifiable object (human figure) detected by the object detection unit 105 to make it unidentifiable to the client (the display unit 200 and the recording server 400). In the present exemplary embodiment, an unidentifiable object refers to an object that should be made unidentifiable to the client.

For example, the event detection unit 106 notifies the image protection unit 102 of the display position information of human figures other than a human figure (object under monitoring) that performed desertion, among human figures detected by the object detection unit 105, but does not notify the image protection unit 102 of the display position information of the human figure (object under monitoring) that performed desertion. Then, the image protection unit 102 applies masking to the display position corresponding to the notified display position information.

More specifically, the event detection unit 106 determines to make displayable on the display unit 200 the object (the human figure that performed desertion) associated with an object (deserted object) identified based on a result of the detection by the object detection unit 105, while the image protection unit 102 does not perform the change processing. In other words, the event detection unit 106 determines to make identifiable to the client the object under monitoring (the human figure that performed desertion).

On the other hand, a human figure determined to be non-displayable without applying the change processing by the image protection unit 102 is displayed by applying the change processing by the image protection unit 102. Although an unidentifiable object is a human figure in the present exemplary embodiment, the unidentifiable object is not limited thereto but may be, for example, a car license plate and a house doorplate.

The event detection unit 106 can simultaneously detect a plurality of events. Further, the user can set and change detection conditions for a plurality of events. The event detection unit 106 encodes the metadata 130 including object information for an object detected by the object detection unit 105 and event information for a detected event as required, and then transmits the metadata 130 to the display unit via the communication interface unit 110.

The image protection unit 102 applies the change processing (masking) for changing display of the human figure detected by the object detection unit 105. Although the image protection unit 102 according to the present exemplary embodiment applies the change processing to a human figure, among objects detected by the object detection unit 105, the target of the change processing is not limited thereto but may be an object possibly be subjected to infringement of privacy, such as a car license plate and a house doorplate. Applying the change processing in this way enables monitoring objects relevant to the detected event while protecting the privacy of objects other than human figures.

The encoding unit 103 encodes the image data that has undergone the change processing by the image protection unit 102. Although the present invention is not dependent on a specific encoding method, JPEG, MPEG-4, H.264/AVC etc. can be used. The image data encoded by the encoding unit 103 is suitably packetized and then transmitted to the display unit 200 via the image transmission unit 104 and the communication interface unit 110. More specifically, the network camera 100 according to the present exemplary embodiment serves as an image processing apparatus which transmits image data.

The display unit 200 includes a communication interface unit 210, an image reception unit 221, an image decoding unit 222, and an image display unit 223. Further, input/output devices such as a display, a keyboard, and a mouse (not illustrated) are connected to the display unit 200. The display unit 200 can extract object information included in the metadata 130 from the network camera 100, and display it with a frame superimposed onto the circumference of an object in the image.

While the network camera 100 transmits the image data 120 and the metadata 130 to the display unit 200, the display unit 200 transmits various control requests and setting requests to the network camera 100. These communications are performed by using the GET method of HTTP, or SOAP.

Figure 3:
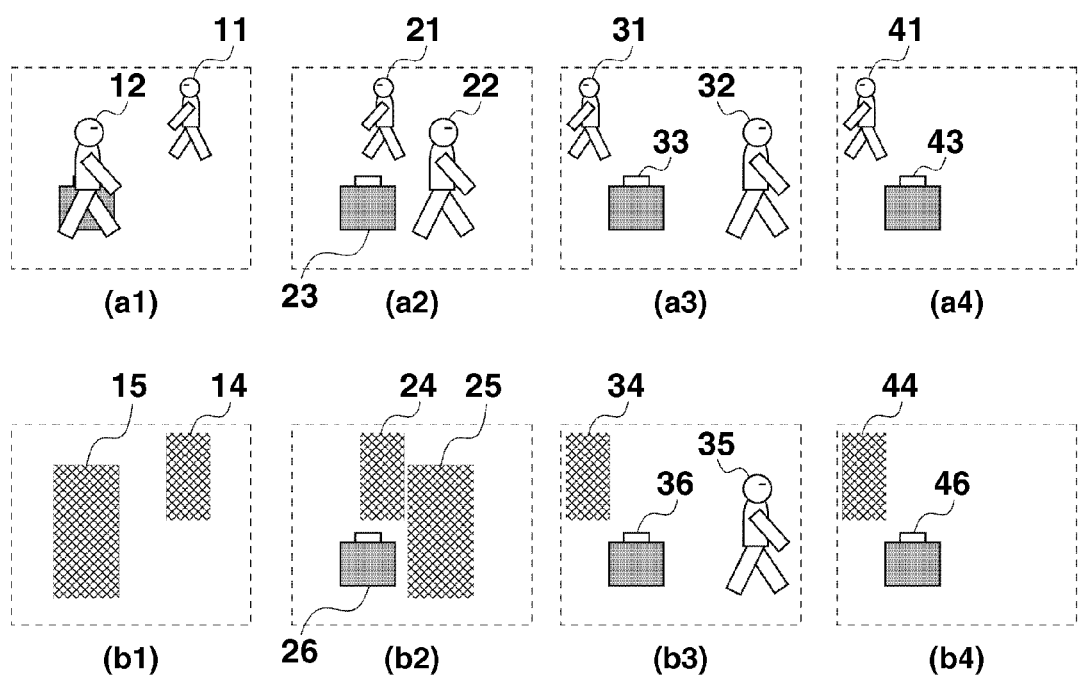
FIG. 3 illustrates an event occurrence and privacy protection canceling processing for a subject.

Masking applied to a human figure in the present exemplary embodiment will be described below. FIG. 3 illustrates four frames a1 to a4 for an identical scene, and masking applied to the frames a1 to a4. States after applying masking to the frames a1 to a4 are illustrated by frames b to b4, respectively. The object detection unit 105 detects two human FIGS. 11 and 12 in a frame a1, and detects two human FIGS. 21 and 22 and an object 23 in a frame a2. The object 23 is a baggage deserted by the human FIG. 22. However, at the timing of the frame a2, since the human FIG. 22 has not yet been sufficiently away from the object 23, the event detection unit 106 does not determine the desertion state. At the timing of the frame a3, when the human FIG. 32 has been sufficiently away from the object 33, the event detection unit 106 determines that the object 33 has been deserted and accordingly detects the event (desertion). At the timing of the frame a4, the human FIG. 32 that performed desertion goes out of the screen.

The object detection unit 105 according to the present exemplary embodiment associates the human FIGS. 12, 22, and 32 in the frames a1 to a4 with each other as an identical human figure. The object detection unit 105 associates the human FIGS. 11, 21, 31, and 41 with each other as an identical human figure, and associates the human FIG. 22 with the object 23 as objects detached from the identical human FIG. 12. The object detection unit 105 associates the human FIG. 32 with the object 33 in a similar way.

Exemplary masking applied to the frames a1 to a4 will be described below with reference to the frames b1 to b4, respectively. In the frame b1, masking is applied to the human FIGS. 11 and 12 as illustrated in mask areas 14 and 15, respectively. Likewise, in the frame b2, masking is applied to the human FIGS. 21 and 22 as illustrated in mask areas 24 and 25, respectively, before they are displayed. However, although an object 26 is detected by the object detection unit 105 as an object, it is displayed while masking is not applied since it is not a human figure. The event detection unit 106 detects the occurrence of the event (desertion) at timing between displaying the frames b2 and b3.

Then, the event detection unit 106 determines to make identifiable on the display unit 200 the human figure (object under monitoring) relevant to the detected the event (desertion). More specifically, the event detection unit 106 determines to make identifiable to the client the object associated with the object 33 (human FIG. 32) identified based on a result of the image data analysis, as an object under monitoring. The event detection unit 106 notifies the image protection unit 102 of the display position information representing the display position of the human FIG. 32 to make it displayable while masking is not applied. Since the human FIGS. 11, 21, 31, and 41 are unidentifiable objects irrelevant to the event detected by the event detection unit 106, masking is applied to these human figures to make them unidentifiable to the client.

To describe tracking processing, a relation between objects illustrated in FIG. 3 will be described in detail below with reference to a time-line in FIG. 4. A human figure a in FIG. 4 corresponds to the human FIGS. 11, 21, 31, 41, 14, 24, 34, and 44 in FIG. 3. A human figure b in FIG. 4 corresponds to the human FIGS. 12, 22, 32, 15, 25, and 35 in FIG. 3. An object c corresponds to baggage 23, 33, 43, 26, 36, and 46 in FIG. 3. The human figure a appears at a time t1 and stays on until a time t8. The human figure b appears at a time t2 and disappears (goes out of the screen) at a time t6. The object c appears at a time t4 and stays on until a time t8. The object c is detached from the human figure b at a time t4. The object c is determined to be deserted at a time t5. Therefore, from the time t5 to the time t6, the human figure b is excluded from human figures subjected to masking. The object detection unit 105 stores a history of detachment and integration of objects through tracking processing in this way. This makes it possible, when an event is detected, to cancel masking only for a human figure relevant to the event and to keep protecting the privacy of other human figures.

Figure 5:
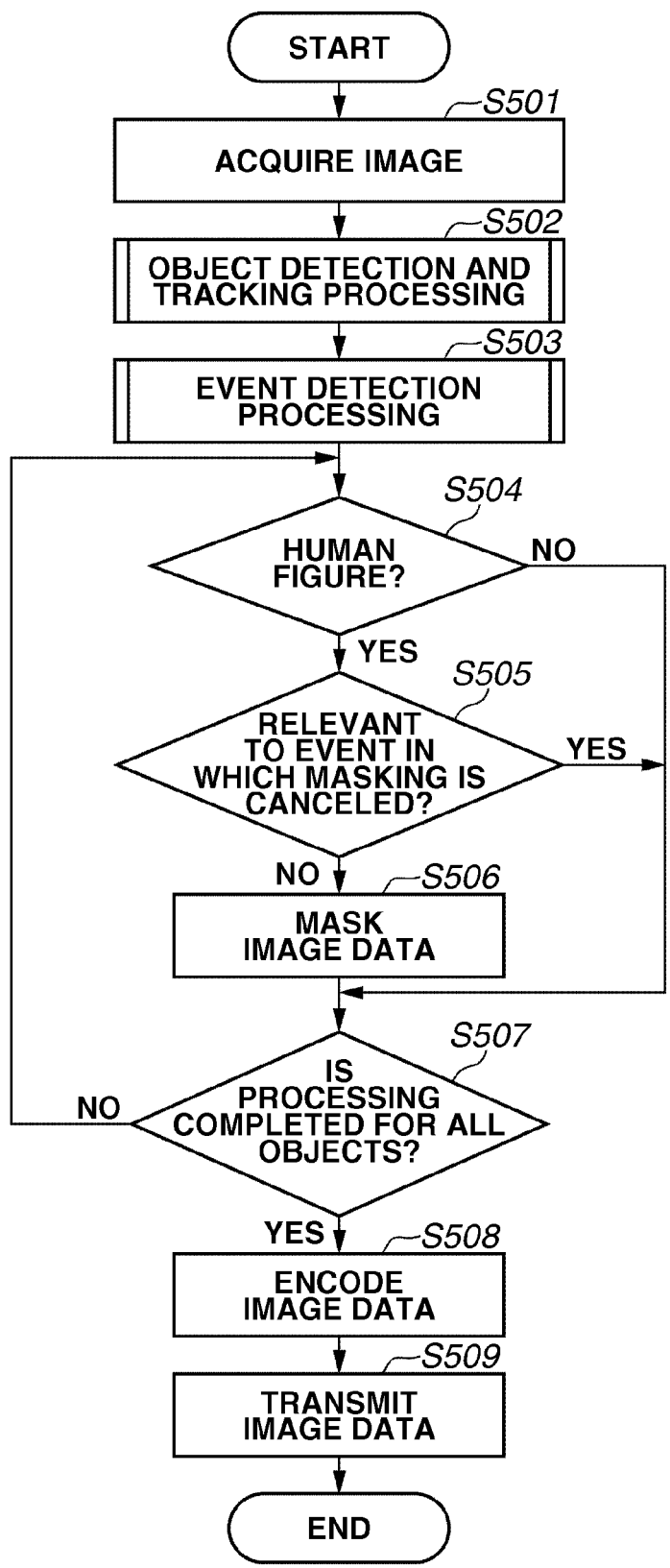
FIG. 5 illustrates privacy protection canceling processing by the network camera.

A flow of masking in the present exemplary embodiment will be described below with reference to FIGS. 5 to 7. FIG. 5 is a flow chart illustrating the entire processing. FIG. 6 is a flow chart illustrating object detection processing by the object detection unit 105. FIG. 7 is a flow chart illustrating event detection processing by the event detection unit 106.

Referring to FIG. 5, in step S501, the imaging unit 101 acquires an image. In step S502 (detection step), the object detection unit 105 performs object detection processing. In step S503 (analysis step), the event detection unit 106 performs event detection processing. More specifically, in step S502, the object detection unit 105 detects objects including unidentifiable objects (human figures) that should be made unidentifiable to the client. In step S503, the event detection unit 106 analyzes the image data based on a result of the object detection in step S502. Processing in steps S502 and S503 will be described below with reference to FIGS. 6 and 7, respectively.

In step S504, the event detection unit 106 determines whether the object detected in step S502 is a human figure. In step S502, the object detection unit 105 determines whether the detected object is a human figure with reference to the object identification database. More specifically, in step S504, the event detection unit 106 determines whether the object detected in step S502 is a human figure by acquiring a result of the object determination by the object detection unit 105 in step S502.

In step S505 (determination step), the event detection unit 106 determines whether the object determined to be a human figure in step S504 is an object under monitoring. The object under monitoring is a human figure (unidentifiable object) relevant to an event wherein masking should be canceled. Events wherein masking should be canceled are prespecified by the user. More specifically, in step S505, the event detection unit 106 determines to make identifiable to the client the human figure that is an object under monitoring that should be monitored by the client.

For example, when desertion is detected which is specified as an event wherein masking should be canceled, a human figure relevant to the desertion (a human figure that performed desertion) will become an object under monitoring. Further, for example, when carry-away is detected which is specified as an event wherein masking should be canceled, a human figure relevant to the carry-away (a human figure that performed carry-away) will become an object under monitoring. A plurality of events wherein masking should be canceled can be specified.

The network camera 100 stores objects relevant to previously detected events based on a result of the object detection in step S502 and a result of the event detection in step S503. Further, the object detection unit 105 associates an object detected in the current frame with an object detected in preceding frames by the object tracking processing in step S502. Therefore, the event detection unit 106 can determine whether the object determined to be a human figure in step S504 is an object under monitoring. When the object determined to be a human figure in step S504 is determined not to be an object under monitoring, the event detection unit 106 notifies the image protection unit 102 of the display position information of the object.

In step S506 (processing step), the image protection unit 102 applies masking to the human figure. More specifically, in step S506, the image protection unit 102 applies the change processing (masking) to the unidentifiable object (human figure) detected by the object detection unit 105. The object subjected to the change processing in step S506 is the object determined not to be an object under monitoring in step S505 among objects detected in step S502 and determined to be a human figure in step S504.

In step S507, the object detection unit 105 determines whether the processing from steps S504 to S506 is completed for all objects detected in step S502. When the object detection unit 105 determines that the processing is not completed for all objects (NO in step S507), the processing returns to step S504. In step S504, the object detection unit 105 performs determination for the next object. Otherwise, when the object detection unit 105 determines that the processing is completed for all objects (YES in step S507), the processing proceeds to step S508. In step S508, the encoding unit 103 performs encoding of the image data of the current frame. In step S509, the image transmission unit 104 transmits the image data encoded by the encoding unit 103 to the display unit 200 and the recording server 400 which requested the image data.

The object detection processing and the object tracking processing by the object detection unit 105 will be described below with reference to FIG. 6. These pieces of processing correspond to the processing of step S502 in FIG. 5. The object detection unit 105 according to the present exemplary embodiment performs the object detection processing by using a background difference. The background difference refers to a method for detecting an object by comparing the current image with a background model generated from preceding images. The present exemplary embodiment uses for the background model a plurality of feature quantities calculated from the discrete cosine transform (DCT) coefficient for each JPEG 8×8 pixel block. JPEG is an abbreviation for the Joint Photographic Coding Expert Group.

A sum of absolute values of DCT coefficients calculated from one block, and a sum of differences between DCT coefficient components of associated blocks in adjacent frames are used as a feature quantity. However, the object detecting method is not limited to the above-mentioned method for obtaining a background model from DCT coefficients but may be a method for obtaining a background model from, for example, the density distribution in pixel units.

Referring to FIG. 6, in step S601, the object detection unit 105 calculates DCT coefficients from image data acquired by the imaging unit 101, and extracts a feature quantity. The object detection unit 105 according to the present exemplary embodiment extracts a feature quantity from low-frequency components among DCT coefficients that can be obtained from each of the Y, U, and V components.

In step S602, the object detection unit 105 compares the feature quantity extracted in step S601 with an existing background model. More specifically, in step S602, the object detection unit 105 calculates a difference between the feature quantity extracted in step S601 and a feature quantity obtained from feature quantities extracted from a plurality of preceding frames. The object detection unit 105 according to the present exemplary embodiment generates a plurality of background models (modes) from feature quantities extracted from preceding frames. More specifically, the object detection unit 105 generates a plurality of background modes so that a plurality of similar feature quantities among feature quantities extracted from each of a plurality of preceding frames forms one background model (mode). Then, the object detection unit 105 calculates a difference between the feature quantity extracted from the current frame in step S601 and the feature quantity corresponding to each of the plurality of background models (modes).

In step S603, the object detection unit 105 determines whether a similar mode is present in the current frame based on a result of the difference calculation in step S602. When the object detection unit 105 determines that a similar mode is present (YES in step S603), the processing proceeds to step S604. In step S604, the object detection unit 105 updates the feature quantity of the similar mode. This is accomplished by mixing at a constant ratio the feature quantity newly extracted in step S601 with the existing feature quantity determined to be similar to the new feature quantity in step S603.

Otherwise, when the object detection unit 105 determines that a similar mode is not present (NO in step S603), the processing proceeds to step S605. In step S605, the object detection unit 105 determines whether a block from which the feature quantity is extracted is a shadow. When a change in chromatic components (U and V components), among the Y, U, and V components used for the feature quantity calculation, is equal to or smaller than a predetermined value, the object detection unit 105 determines that the block is a shadow.

When the object detection unit 105 determines that the block is a shadow (YES in step S605), the processing proceeds to step S606. In step S606, the object detection unit 105 does not update the existing feature quantity and the processing proceeds to step S608. Otherwise, when the object detection unit 105 determines that the block is not a shadow (NO in step S605), the processing proceeds to step S607. In step S607, the object detection unit 105 generates a new mode and the processing proceeds to step S608.

In step S608, the object detection unit 105 determines whether processing is completed for all blocks of the current frame. When the object detection unit 105 determines that processing is completed for all blocks (YES in step S608), the processing proceeds to step S609. Otherwise, when the object detection unit 105 determines that processing is not completed for all blocks (NO in step S608), the processing returns to step S601. In step S601, the object detection unit 105 processes an unprocessed block.

In step S609, the object detection unit 105 divides each block of the current frame into a background block and a foreground block such as an object. The object detection unit 105 recognizes a block which is determined, for example, as having no similar background model (mode), as a foreground block. Further, the object detection unit 105 recognizes a block which is determined, for example, as having a similar background model, as a background block.

In step S610, the object detection unit 105 performs area generation processing by connecting adjacent foreground blocks. More specifically, in step S610, the object detection unit 105 connects adjacent blocks determined to be a foreground block in step S609 to generate a foreground block area.

In step S611, the object detection unit 105 removes small areas as noise. More specifically, when the area of the foreground block area generated in step S610 is equal to or smaller than a predetermined area, the object detection unit 105 recognizes the area as a background block.

In step S612, the object detection unit 105 detects the foreground block area as an object and, at the same time, acquires object information of the detected object. As mentioned above, the object information transmitted to an image data destination includes, for example, at least any one of the display position, area, circumscribed rectangle, presence time, moving distance (moving path length), and area masking state (whether or not area masking is applied) of the detected object. The presence time information among pieces of object information transmitted to the image data destination can be extracted when the processing of step S613 is completed. The information about the masking state can be extracted when the processing of step S613 is completed or when the event detection processing (described below) is completed.

In step S612, the object detection unit 105 determines whether the detected object is a human figure with reference to the object identification database (not illustrated). For example, the object detection unit 105 determines whether the detected object is a human figure depending on whether the image pattern of the detected object includes a face image pattern stored in the object identification database. For example, the object detection unit 105 can also determine whether the detected object is a human figure depending on whether the shape of the detected object corresponds to a human figure stored in the object identification database.

In step S613, the object detection unit 105 performs the object tracking processing. More specifically, in step S613, the object detection unit 105 associates the object detected in the current frame with an object detected in a preceding frame.

The object tracking processing performed in step S613 associates objects in a frame and objects between adjacent frames. This association includes the association of objects by the object detachment and integration processing. More specifically, when an object having similar image features to the one detected in step S612 has been detected in a preceding frame, the object detection unit 105 associates these objects with each other. The color distribution, texture, template, aspect ratio, etc. can be used as an image feature.

Further, the object detection unit 105 associates the object detected in step S612 with an object close thereto in the same frame. For example, the object detection unit 105 associates a human figure with a deserted object. More specifically, the object detection unit 105 associates a plurality of objects based on the display position of the detected object.

Further, the object detection unit 105 associates the object detected in step S612 with an object detected at almost the same position in a preceding frame. More specifically, when the distance between the display position of the object detected in the first frame and the display position of the object detected in a preceding frame (second frame) is equal to or shorter than a predetermined distance, the object detection unit 105 associates these objects with each other.

Further, when neither an object having similar image features to the object detected in step S612 nor an object detected at almost the same position as the object detected in step S612 has been detected in preceding frames, the object detection unit 105 registers the object detected in step S612 as a new object.

For example, the human FIGS. 11, 21, 31, and 41 in FIG. 3 are associated with each other as objects having similar image features. When a human figure deserts a baggage, the object detection unit 105 detects in step S613 that a plurality of objects (the human figure and the baggage) detected in a certain frame (first frame) is detached from one object (the human figure having the baggage) detected in a frame (second frame) preceding the first frame. In this case, the object detection unit 105 associates the plurality of objects (the human figure and the baggage) detected in the first frame with the object (the human figure having the baggage) detected in the second frame.

The event detection processing by the event detection unit 106 according to the present exemplary embodiment will be described below with reference to FIGS. 7 and 8. This processing corresponds to the processing of step S503 in FIG. 5. The event detection processing detects an event such as desertion, carry-away, appearance, and disappearance of an object based on a result of the object detection processing. The event detection unit 106 according to the present exemplary embodiment detects the occurrence of an event by determining whether the display position, area, presence time, and moving distance of the object detected by the object detection unit 105 are all within a predetermined range. FIG. 8 illustrates exemplary condition settings for detecting an event. FIG. 8 illustrates exemplary IDs, setting value names, descriptions, and exemplary values.

The network camera 100 according to the present exemplary embodiment can set rule names (ID 00 and ID 01), enable flag (ID 02), area lower- and upper-limits (ID 03 and ID 04), and presence time lower- and upper-limits (ID 05 and ID 06) as event detection conditions. Further, the network camera 100 can set moving distance lower- and upper-limits (ID 07 and ID 08), number-of-objects lower- and upper-limits (ID 09 and ID 10), number of detection area vertexes (ID 20), and detection area vertex coordinate values (ID 21 to ID 28). Further, although not illustrated, the network camera 100 sets a flag for indicating whether the object detected by the object detection unit 105 is an object detached from another one or an object formed as a result of integration of a plurality of objects.

The event detection unit 106 detects an event based on conditions satisfied by the object detected by the object detection unit 105 among the above-mentioned conditions. The event detection unit 106 determines the presence time and other conditions of objects associated as one object by the object detection unit 105.

For example, when an object detached from another one stands still within a predetermined range on the screen for more than a fixed time, the event detection unit 106 detects the event of desertion. More specifically, when an object detached from another one within an area other than a screen edge is detected wherein the presence time reaches a predetermined time duration and the moving distance is equal to or shorter than a predetermined distance, the event detection unit 106 detects the event of desertion. More specifically, when an object is detected wherein the vertex coordinate values (ID 21 to ID 28), presence time lower-limit, and moving distance upper-limit of the event detection conditions are satisfied, and when the detachment flag is set to ON, the event detection unit 106 detects the event of desertion.

Further, when an object is detected wherein the area is within a predetermined range, the presence time reaches a predetermined time duration, and the moving distance reaches a predetermined distance, the event detection unit 106 detects the event of prowl. More specifically, when an object is detected wherein the area upper-limit, presence time lower-limit, and moving distance lower-limit of the event detection conditions (FIG. 8) are satisfied, the event detection unit 106 detects the event of prowl.

When a new object is detected wherein the following conditions are satisfied, the event detection unit 106 detects the event of carry-away. More specifically, when a new object is detected wherein the rate of the area overlapping with a predetermined area under detection, to the area under detection, is equal to or larger than a predetermined value, the difference between the two areas is equal to or smaller than a predetermined value, and the presence time is equal to or longer than a predetermined time duration, the event detection unit 106 detects the event of carry-away. The event detection unit 106 sets an area under detection so as to enclose the boundary of the object under detection. Then, when the object under detection is carried away, the original background appears and is detected as a new object. The area and circumscribed rectangle of a new object detected in the area under detection are almost the same as those of the object under detection.

More specifically, when an object is detected wherein the area lower- and upper-limits, vertex coordinate values (ID 21 to ID 28), and presence time lower-limit of the event detection conditions (FIG. 8) are satisfied, the event detection unit 106 detects the event of carry-away. However, carry-away can also be detected by using any one of the above-mentioned conditions. The event detection unit 106 sets condition values for each event to be detected. For example, the event detection unit 106 separately sets a presence time as a condition for detecting desertion and a presence time as a condition for detecting prowl.

When a new object is detected at a screen edge, the event detection unit 106 detects the event of appearance. When the event detection unit 106 can no longer detect an existing object at a screen edge, the event detection unit 106 detects the event of disappearance. In this way, the event detection unit 106 detects the occurrence of an event based on whether the object detected by the object detection unit 105 satisfies at least any one of the event detection conditions illustrated in FIG. 8.

FIG. 7 is a flow chart illustrating the event detection processing by the event detection unit 106. The event detection unit 106 performs the processing of steps S701 to 708 for each event detected. Referring to FIG. 7, in step S701, the event detection unit 106 determines whether the display position of the object detected by the object detection unit 105 is within a preset range. More specifically, the event detection unit 106 determines whether the display position of the detected object is within a range between display position (X and Y coordinates) upper- and lower-limits preset for each object. When display position determination is not performed, the event detection unit 106 sets display position upper- and lower-limits to the possible maximum and minimum values, respectively. Thus, the display position of the detected object constantly satisfies the conditions.

In step S702, the event detection unit 106 determines whether the on-screen size (area) of the object is within a preset range. In step S703, the event detection unit 106 determines whether the presence time of the object is within a preset range. In step S704, the event detection unit 106 determines whether the moving distance of the object is within a preset range. Similar to step S701, when display position determination is not required, the event detection unit 106 sets upper- and lower-limits to the possible maximum and minimum values, respectively.

In step S705, the event detection unit 106 determines whether determination processing is completed for all of the objects detected by the object detection unit 105. When the event detection unit 106 determines that determination processing is completed for all of the objects (YES in step S705), the processing proceeds to step S706. Otherwise, when the event detection unit 106 determines that determination processing is not completed for all of the objects (NO in step S705), the processing returns to step S701. In step S701, the event detection unit 106 performs determination processing for another object.

In step S706, the event detection unit 106 determines whether the number of objects satisfying the conditions of steps S701 to S704 is within a preset range. For example, when there are two objects determined to satisfy the desertion conditions in the processing from step S701 to S704 and there are one to five objects set for desertion, the event detection unit 106 determines that the number of objects satisfying the conditions is within a preset range. Further, for example, when there are six objects determined to satisfy the carry-away conditions in the processing from step S701 to S704 and there are one to two objects set for carry-away, the event detection unit 106 determines that the number of objects satisfying the conditions is out of a preset range.

When the event detection unit 106 determines that the number of objects satisfying the conditions is within the preset range (YES in step S706), the processing proceeds to step S707. Otherwise, when the event detection unit 106 determines that the number of objects satisfying the conditions is out of the preset range (NO in step S706), the processing proceeds to step S708.

In step S707, the event detection unit 106 sets the event determining result to true (sets the event state to ON). Referring to FIG. 3, the event detection unit 106 determines to make identifiable to the client (display unit 200) the unidentifiable object (human FIG. 32) relevant to the detected event (desertion). More specifically, the event detection unit 106 determines not to notify the image protection unit 102 of the display position information of the human FIG. 32 to make it displayable on the display unit 200 while the change processing is not applied by the image protection unit 102. More specifically, in step S707, the event detection unit 106 determines to make identifiable to the client, as an object under monitoring, the object (human FIG. 32) relevant to the object (object 33) identified based on a result of the object detection by the object detection unit 105.

Further, the event detection unit 106 instructs the image protection unit 102 to apply masking to the unidentifiable object which is not determined to be an object under monitoring in step S707, among human figures detected by the object detection unit 105, to make it unidentifiable to the client.

In step S708, the event detection unit 106 determines whether the processing of steps S701 to S707 is completed for all events. When the event detection unit 106 determines that the processing is completed (YES in step S708), it ends the event detection processing for the current frame.

The network camera 100 according to the present exemplary embodiment cancels or does not cancel masking according to whether the image data destination is the viewer (display unit) or the recording server. For example, the image protection unit 102 transmits to a regular viewer the image data while masking is applied to all human figures regardless of whether an event has occurred or not. On the other hand, the image protection unit 102 transmits to a limited viewer the image data while masking is canceled only for a human figure relevant to an event. Further, the image protection unit 102 transmits to the administrator's viewer image data with masking canceled for all human figures regardless of whether an event has occurred or not. Thus, the network camera 100 cancels or does not cancel masking for the unidentifiable object relevant to an event depending on the authority of the client (viewer).

Although the present exemplary embodiment has been described based on a case where the object detection unit 105 is provided with a human body detection function, the object detection unit 105 may not be provided with the human body detection function. When the object detection unit 105 is not provided with the human body detection function, for example referring to FIG. 3, the object detection unit 105 detects the human FIGS. 21 and 22 and the baggage 23 as objects 21, 22, and 23. As a result, the image protection unit 102 applies the change processing (masking) not only to the mask areas 24 and 25 but also to the object 26. Referring to FIG. 4, the image protection unit 102 applies masking to the object c from the time t4 to the time t5, and cancels masking to the object c after the time t5.

Although the present exemplary embodiment has been described centering on a case where the change processing is canceled for a human figure relevant to the detected event, the network camera 100 according to the present exemplary embodiment can also transmit image data while the change processing is canceled for a human figure relevant to the event among human figures detected in frames preceding the event detection. For example, referring to FIG. 4, when desertion is detected at the time t5, the image transmission unit 104 transmits image data while the change processing is canceled for the human figure b after the time t5. In addition to this, the image transmission unit 104 transmits image data while the change processing is canceled for the human figure b before the time t5. In this case, image data of a frame having the same sequence number as one already transmitted is transmitted to the display unit 200.

Upon reception of the image data of the frame having the same sequence number as one already received, the display unit 200, when the frame of the sequence number has not yet been reproduced, reproduces the image data of the frame received last. This algorithm improves the possibility that the human figure (object under monitoring) relevant to the detected event can be observed. Further, when reproducing image data in the recording server, the object relevant to the event is displayable while the change processing is not applied.

Figure 4:
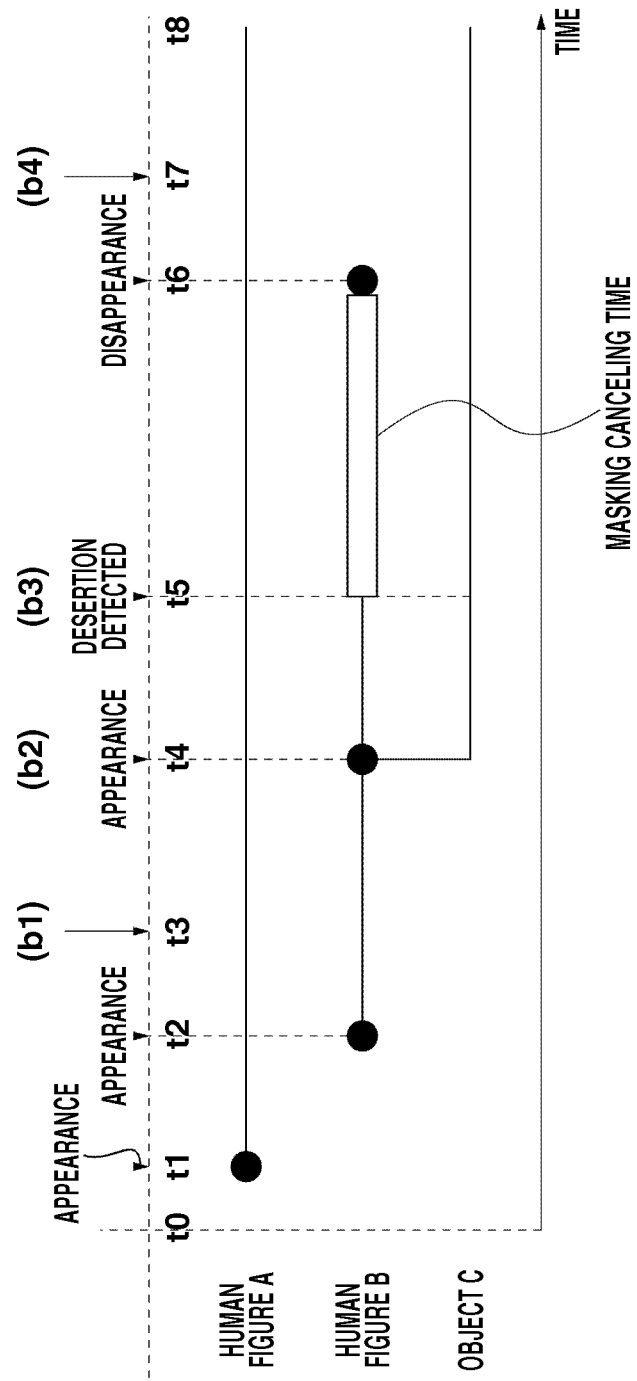
FIG. 4 illustrates a relation between object tracking processing and privacy protection canceling processing.

In this case, in step S707 (determination step) in FIG. 7, the event detection unit 106 determines to make identifiable to the client the object (human FIG. 32) relevant to the event (desertion) detected in the frame (first frame) at the time t5 in FIG. 4. Further, the event detection unit 106 determines to make identifiable to the client the object (human FIG. 22), associated with the human FIG. 32, detected in a frame (second frame) before the time t5. Then, the event detection unit 106 notifies the image protection unit 102 of the identification information of the second frame and the display position information of the human FIG. 22. The image protection unit 102 generates image data while the change processing is canceled for the human FIG. 22 from the image data of the second frame, which has already undergone the change processing and has been transmitted to the display unit 200. The generated image data is transmitted to the display unit 200 via the encoding unit 103 and the image transmission unit 104.

More specifically, in step S707, the event detection unit 106 determines to make identifiable to the client the object under monitoring (the human figure relevant to the event), among objects detected in the image data of the first frame, based on a result of the object detection by the object detection unit 105. Further, the event detection unit 106 determines to make identifiable to the client the object detected in the image data of the second frame and associated with the object under monitoring detected in the image data of the first frame.

As an exemplary event other than desertion, detection of prowl will be described below. As mentioned above, the event of prowl is detected when the area lower-limit, area upper-limit, presence time lower-limit, and moving distance lower-limit of the event detection conditions for the detected event are satisfied. In step S706, when the event detection unit 106 detects prowl of a human figure A, the even detection unit 106 determines to cancel the change processing for the human figure A detected between the second frame preceding the first frame (in which prowl is detected) and the first frame. More specifically, when an object relevant to the human figure A detected in the first frame is continuously detected in the image data from the second to the first frames, the event detection unit 106 determines to make the relevant object identifiable to the client.

Detection of desertion will be described below. As mentioned above, the event of desertion is detected when an object is detected wherein the vertex coordinate values, presence time lower-limit, and moving distance upper-limit of the event detection conditions are satisfied, and the detachment flag is set to ON. Further, when the human figure A deserts the object A, the deserted object (object A) and the object (human figure A) that deserted the object A are associated with each other by the object detection unit 105. More specifically, a plurality of objects (the human figure A and the object A) associated with the object (the human figure A) detected in the image data of the second frame preceding the first frame are detected in the first frame. In this case, the event detection unit 106 determines to make identifiable to the client at least one (human figure A) of the plurality of objects detected in the first frame and determines to make identifiable thereto the human figure A detected in the second frame.

Detection of carry-away will be described below. As mentioned above, the event of carry-away is detected when the rate of the area overlapping with a predetermined area under detection, to the area under detection is equal to or larger than a predetermined value, the difference between the two areas is equal to or smaller than a predetermined value, and the presence time is equal to or longer than a predetermined time duration. More specifically, when the image data in the area under detection from a third frame to the first frame is continuously different from the image data in the area under detection of the second frame, the event detection unit 106 detects the event of carry-away. The third frame exists between the first frame and the second frame that precedes the first frame.

More specifically, the second frame precedes the first frame by a first predetermined number of frames, and the third frame precedes the first frame by a second predetermined number of frames. When a newly detected object satisfies the carry-away conditions, the object detection unit 105 associates an object having a display area close to (or overlapping with) the newly detected object with the newly detected object.

In step S706, when the event detection unit 106 detects the carry-away of an object B in the first frame, the event detection unit 106 determines to make identifiable to the client the human figure associated with the object B among human figures detected in the image data of the first frame. Further, the event detection unit 106 determines to make identifiable to the client the object detected in the image data of the second frame and associated with the object B detected in the first frame.

The image protection unit 102 applies the change processing (masking) to objects other than the object (object under monitoring) to be made identifiable to the client, among unidentifiable objects (human figures) detected by the object detection unit 105, so as to make them unidentifiable to the client.

The above configuration improves the possibility that an object relevant to an event can be observed even when the object relevant to the event has already disappeared at the time when the event is detected.

As mentioned above, the network camera 100 according to the present exemplary embodiment applies masking to each human figure detected in the image and, at the same time, cancels masking for a human figure relevant to a specific event. This improves the possibility that an object relevant to the detected event can be observed. Further, the network camera 100 according to the present exemplary embodiment enables configuring a monitoring system also in consideration of privacy.

Figure 9:
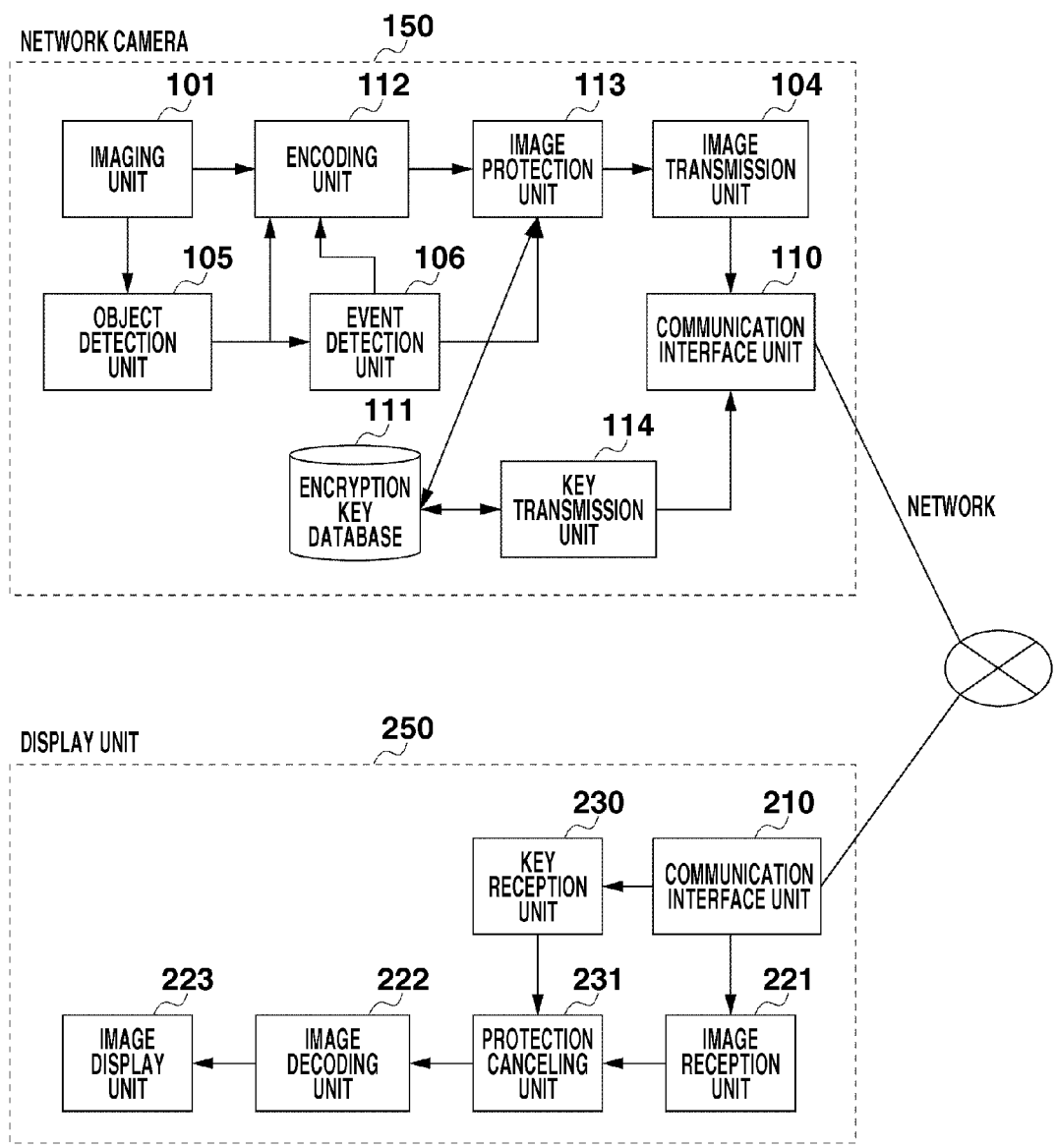
FIG. 9 illustrates a system configuration for performing encryption processing for privacy protection.

A second exemplary embodiment will be described below focusing on differences from the first exemplary embodiment. FIG. 9 illustrates a configuration of a network camera 150 and a display unit 250 in the present exemplary embodiment. The network camera 150 transmits image data to the display unit 250 and a recording server (not illustrated) which requested image data.

The network camera 150 according to the present exemplary embodiment is provided with an encryption function, and the display unit 250 (viewer) and recording apparatus are provided with an encryption cancel function. The network camera 150 transmits image data having each encrypted human figure (unidentifiable object) to the display unit 250. Upon detection of an event, the network camera 150 transmits to the display unit 250 or the recording apparatus key information for canceling the encryption of a human figure relevant to the event. The display unit 250 and the recording apparatus cancel the encryption of the human figure by using the key information received from the network camera 150 and display the human figure. Although the present exemplary embodiment will be described based on a case where a detected human figure is encrypted, any object other than human figures can be encrypted.

The image protection unit 102 according to the first exemplary embodiment applies masking (mosaic, blur, etc.) for the purpose of privacy protection. On the other hand, an image protection unit 113 according to the present exemplary embodiment performs the encryption processing for that purpose. This encryption processing can make a certain human figure unidentifiable to the client (display unit 250). Then, the network camera 150 transmits the key information for canceling the encryption of a human figure in response to the event detection and depending on the authority of the display unit 250. For example, the network camera 150 transmits to the display unit 250 having a specific authority, among a plurality of display units 250, the key information for canceling the encryption of a human figure relevant to the detected event. On the other hand, the network camera 150 does not transmit to the display unit 250 not having a specific authority the key information for canceling the encryption of the human figure relevant to the event.

This method enables transmitting image data without generating a plurality of streams even at the time of image data transmission to a plurality of display units 250 having different authorities.

Referring to FIG. 9, an encoding unit 112 encodes each unidentifiable object (human figure) detected by the object detection unit 105. The image protection unit 113 encrypts each human figure encoded by the encoding unit 112. The image protection unit 113 performs this processing by using a different encryption key for each human figure. The correspondence between human figures and encryption keys used for encryption is stored in an encryption key database 111. When an event is detected by the event detection unit 106, a key transmission unit 114 transmits to the display unit 250 and a recording server (not illustrated) the key information for canceling the encryption of the human figure relevant to the event. More specifically, the key transmission unit 114 transmits to the display unit 250 the key information for generating the image data before the image protection unit 113 applies the change processing to the object determined to be identifiable to the client (display unit 250) by the event detection unit 106.

The display unit 250 according to the present exemplary embodiment differs from the display unit 200 according to the first exemplary embodiment in that it includes a key reception unit 230 and a protection canceling unit 231. The protection canceling unit 231 cancels the encryption of the human figure corresponding to the key information received by the key reception unit 230.

The following method can be used as a technique for exchanging the key information. More specifically, the network camera 150 encrypts the key information for canceling the encryption of the human figure relevant to the detected event by using a key common with the display unit 250, and then transmits the key information to the display unit 250.

Upon reception of the key information encrypted by using the common key, the protection canceling unit 231 cancels the encryption of the human figure relevant to the event by using the acquired key information.

As another method, the key transmission unit 114 can also store the key information in the header area of the image data and then transmits the image data. Further, for example, the key transmission unit 114 can also transmit the key information as an abnormal condition message. In this case, the key transmission unit 114 transmits the key information as a simple object access protocol (SOAP) message or as an attached material through the simple mail transfer protocol (SMTP).

As mentioned above, the image protection unit 113 of the network camera 150 according to the present exemplary embodiment encrypts each human figure to make displayable on the image data destination (display unit 250) each human figure detected in the image data, with the change processing (encryption) applied. Upon detection of an event, the event detection unit 106 notifies the key transmission unit 114 of identification information for identifying the human figure (object under monitoring) relevant to the event. The key transmission unit 114 retrieves from the encryption key database 111 the key information for canceling the encryption of the human figure (object under monitoring) corresponding to the identification information and then transmits the key information to the display unit 250. More specifically, the event detection unit 106 determines to make displayable on the display unit 250 the human figure (object under monitoring) relevant to the detected event while the change processing (encryption) is not applied by the image protection unit 113. In other words, the event detection unit 106 determines to make identifiable to the client (display unit 250) the object relevant to the event among unidentifiable objects (human figures).

The image reception unit 221 of the display unit 250 receives image data from the network camera 150. The key reception unit 230 of the display unit 250 receives key information from the network camera 150. The protection canceling unit 231 cancels the encryption of the human figure relevant to the event among human figures in the image data received by the image reception unit 221, by using the key information received by the key reception unit 230. Thus, the image display unit 223 can display the object (object under monitoring) relevant to the event detected by the network camera 150 with the object not encrypted.

According to the present exemplary embodiment, for example, when the change processing is canceled for the object relevant to the detected event depending on the privacy-related authority provided by the display unit, image data to be transmitted can be unified. More specifically, the key transmission unit 114 of the network camera 150 according to the present exemplary embodiment transmits to the display unit 250 having the privacy-related authority the key information for canceling the encryption of the human figure relevant to the event, but does not transmit the key information to the display not having the authority. Thus, the network camera 150 transmits identical image data to the display unit having the authority and the display unit not having the authority. In this case, the image data can be made displayable only on the display unit having the authority while the change processing is canceled for the object relevant to the event by using key information.

Further, according to the present exemplary embodiment, the display unit 250 can cancel the change processing (encryption) for the object (object under monitoring) relevant to the event detected by the network camera 150 among human figures (unidentifiable objects) in the received image data.

Figure 10:
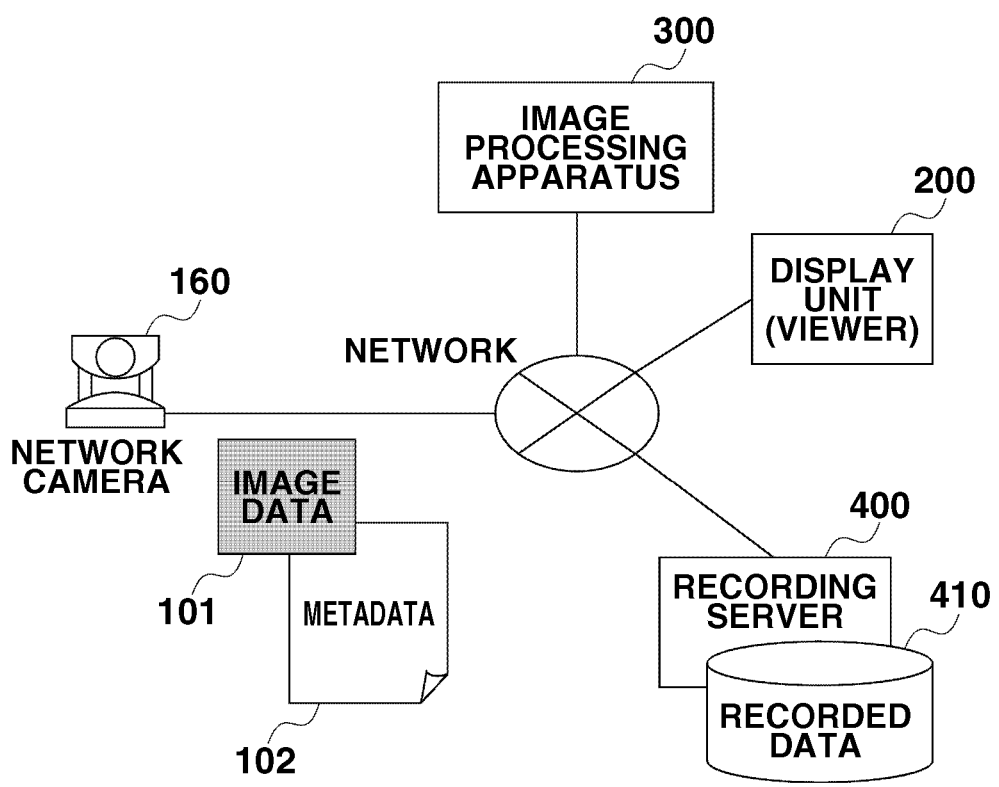
FIG. 10 illustrates a system configuration for performing object detection by the camera and event detection by an image processing apparatus.

A third exemplary embodiment will be described below focusing on differences from the first and second exemplary embodiments. In the present exemplary embodiment, processing is distributed by using an image processing apparatus. More specifically, the network camera 100 performs object detection processing, and the image processing apparatus performs event detection and image protection processing. Accordingly, even if the network camera 100 is not provided with sufficient processing capabilities, the change processing can be applied or canceled for each object. As the change processing for a human figure, an image protection unit 305 according to the present exemplary embodiment applies masking thereto in a similar way to the first exemplary embodiment. FIG. 10 illustrates a system configuration of the present exemplary embodiment. A system according to the present exemplary embodiment includes an image processing apparatus 300 in addition to the configuration illustrated in FIG. 1.

Figure 11:
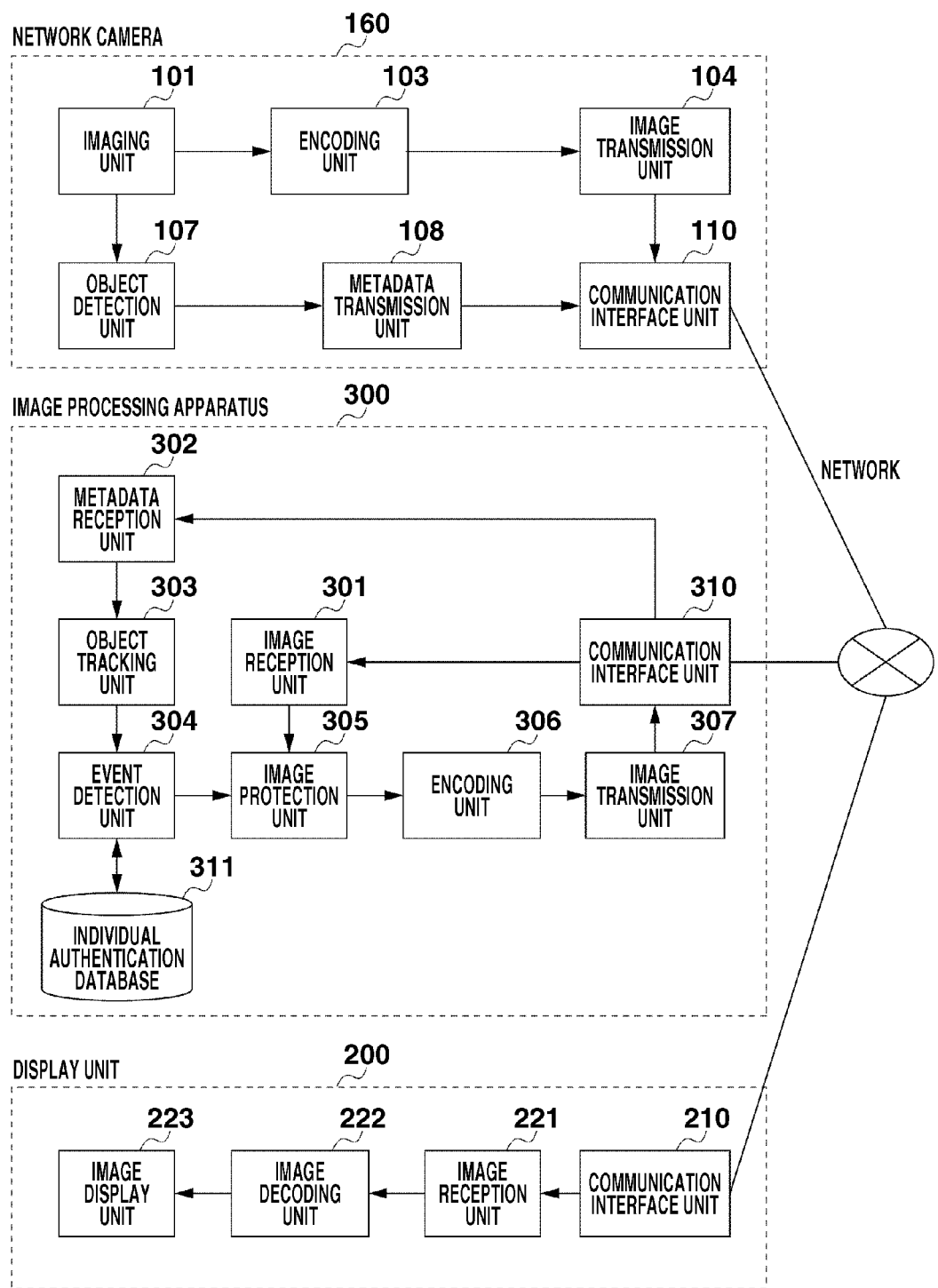
FIG. 11 illustrates internal configurations of the network camera, the image processing apparatus, and the display unit for object detection by the camera and event detection by the image processing apparatus.

FIG. 11 illustrates exemplary configurations of the network camera 160, the image processing apparatus 300, and the display unit 200 according to the present exemplary embodiment. The display unit 200 has a similar configuration to the display unit according to the first exemplary embodiment.

The network camera 160 includes the imaging unit 101, the encoding unit 103, the image transmission unit 104, an object detection unit 107, a metadata transmission unit 108, the communication interface unit 110, and the object identification database (not illustrated). The object detection unit 107 according to the present exemplary embodiment determines whether the detected object is a human figure with reference to the object identification database.

The metadata transmission unit 108 generates metadata including object information such as the position, area (size), and circumscribed rectangle of the object detected by the object detection unit 107, and then transmits the metadata to image processing apparatus 300. The metadata transmission unit 108 generates metadata including face detection information used for identifying the individual of the object determined to be a human figure by the object detection unit 107, and then transmits the metadata to image processing apparatus 300. The contents of metadata will be described in detail below.

The image processing apparatus 300 includes a communication interface unit 310, a metadata reception unit 302, an object tracking unit 303, an event detection unit 304, an image reception unit 301, the image protection unit 305, an encoding unit 306, an image transmission unit 307, and an individual authentication database 311.

The metadata reception unit 302 receives metadata from the network camera 160. The object tracking unit 303 performs similar object tracking processing to the object detection unit 105 according to the first exemplary embodiment. The event detection unit 304 detects the occurrence of an event by using the metadata received from the network camera 160. When the face detection information is included in the metadata, the event detection unit 304 identifies the individual by using the individual authentication database 311. The image reception unit 301 receives image data from the network camera 160 and then decodes the image data. The image protection unit 305, the encoding unit 306, and the image transmission unit 307 have similar functions to the image protection unit 102, the encoding unit 103, and the image transmission unit 104, respectively, in FIG. 2.

The contents of the metadata transmitted from the network camera 160 to the image processing apparatus 300 will be described below with reference to FIG. 12. FIG. 12 illustrates the ID, metadata identifier, metadata description, and exemplary data format.

Metadata includes frame information (ID 10 to ID 13), object information (ID 20 to ID 28), and object area mask information (ID 30 to ID 32). The frame information is described by ID 10 to ID 13. The ID 10 is an identifier representing the start of the frame information. The ID 11 denotes the frame number, the ID 12 denotes the frame time, and the ID 13 denotes the size of a space in which objects exist.

The object information is described by ID 20 to ID 28. The ID 20 is an identifier representing the start of the object information. The ID 21 denotes the number of objects, the ID 22 denotes the object size, the ID 23 denotes the circumscribed rectangle, the ID 24 denotes the representative point, ID 25 denotes the presence time, the ID 26 denotes the moving path length (moving distance), and the ID 27 denotes the motion (object speed). The ID 21 to ID 28 have data for each object (human figure).

The representative point (ID 24) denotes coordinate values representing the display position, and may be the center of gravity of the object. The existence time (ID 25) denotes an elapsed time since an object is detected. The moving path length (ID 26) denotes the distance over which the object has moved on the screen. The motion (ID 27) denotes the object speed that can be obtained, for example, from the display position of the object detected in a preceding frame. The object identification result (ID 28) is a result of identification objects such as a human figure and a car.

The object area mask information is described by ID 30 to ID 32. The ID 30 is an identifier representing the start of the object area mask information. The ID 31 denotes the compression method, i.e., the loss-less compression method such as uncompressed encoding and run-length limited encoding. The ID 32 describes a masked object area with a block number array.

There are some methods for metadata transmission. One method transmits metadata represented in the XML format separately from the image data. Another method transmits metadata represented in the binary format attached to the image data. The XML method has an advantage that the image data and metadata can be easily transmitted at different frame rates. More specifically, the use of the XML method enables the metadata transmission unit 108 to easily transmit metadata for one frame with a plurality number of frames, for example, when a number of objects are detected in one frame. On the other hand, since the use of the binary method easily enables synchronization between the metadata and the image data, the method has an advantage of being especially effective for the JPEG encoding method.

FIG. 13 is an exemplary metadata represented in the XML format. This is exemplary metadata when two objects are detected in one frame. Since the network camera 160 according to the present exemplary embodiment transmits the above-mentioned metadata, the image processing apparatus 300 can perform event detection processing and, based on a result of the event detection processing, cancel masking for the object under monitoring.

Returning to FIG. 11, a processing flow between the network camera 160, the image processing apparatus 300, and the display unit 200 according to the present exemplary embodiment will be described below. The network camera 160 detects an object from image data, generates metadata, and then transmits the encoded image data and metadata to the image processing apparatus 300.

The image reception unit 301 of the image processing apparatus 300 decrypts the received image data. The object tracking unit 303 performs object tracking processing based on the metadata received by the metadata reception unit 302. The event detection unit 304 performs event detection processing. The object tracking processing corresponds to the processing of step S613 in FIG. 6. The event detection processing corresponds to the processing in FIG. 7. The image protection unit 305 applies the change processing (masking) in a similar way to the image protection unit 102 according to the first exemplary embodiment. More specifically, the image protection unit 305 does not apply the change processing to a human figure (object under monitoring) relevant to the event detected by the event detection unit 304, and applies the change processing to a human figure irrelevant thereto, among objects detected by the object detection unit 107 of the network camera 160. Then, the encoding unit 306 encodes the image data from the image protection unit 305, and image transmission unit 307 transmits the encoded image data to the display unit 200. Thus, the display unit 200 displays the object (object under monitoring) relevant to the event while the change processing is not applied, and displays the unidentifiable object (human figure) irrelevant to the event with the change processing applied.

The image processing apparatus 300 according to the present exemplary embodiment includes the individual authentication database 311 to perform advanced event determination processing. More specifically, only when the object detection unit 107 detects a human figure not registered in the individual authentication database 311, the image processing apparatus 300 determines that the human figure is an object under monitoring. Then, the image processing apparatus 300 applies the change processing to the human figure determined to be an object under monitoring to make it unidentifiable to the client (display unit 200).

For example, only when a human figure satisfying the conditions of prowl is not registered in the individual authentication database 311, the event detection unit 304 determines that the event of prowl has occurred and makes displayable the object (the human figure that is prowling) relevant to the event while the change processing is not applied.

As mentioned above, when the image processing apparatus 300 other than the network camera 100 performs event detection processing among processing performed by the network camera 100 according to the first exemplary embodiment in this way, advanced event detection processing can be achieved even with insufficient processing resources of the network camera 100.

A fourth exemplary embodiment will be described below based on a case where the change processing (masking or encryption) is canceled when an event other than desertion is detected, based on the configuration of the first exemplary embodiment including the network camera 100 and the display unit 200.

For example, when the event detection unit 106 detects the event of carry-away, the human figure that performed carry-away has already been away from the position where a first object under detection (object carried away) existed. However, the object that appeared in the area of the first object under detection after detection of carry-away is associated with the human figure that performed carry-away through the tracking processing by the object detection unit 105, thus making identifiable to the client the human figure that performed carry-away.

Further, when the object detection unit 105 detects a gathering of a plurality of human figures, the event detection unit 106 determines to cancel the change processing for these human figures to observe where they come from and where they go to. More specifically, the event detection unit 106 counts the number of human figures in the area under detection and, when it reaches a certain value, the event detection unit 106 detects the event of gathering. Further, the event detection unit 106 determines to cancel the change processing (masking or encryption) until the human figure that existed in the area under detection at the time of detection of the event of gathering goes out of the screen. With this algorithm, human figures relevant to the event of gathering can be made identifiable to the client that receives image data.

Other events that should be detected in addition to the above-mentioned events include snatch, violence, and other injury acts. To make identifiable a human figure relevant to such an injury act, the event detection unit 106 according to the present exemplary embodiment detects an injury act. For example, when the object detection unit 105 detects that two human figures approach and stands still for more than a predetermined time duration and then one human figure goes out of the screen but the other one stands still, the event detection unit 106 detects the event of injury act.

With this algorithm, the event detection unit 106 can detect the occurrence of an injury act, for example, when the following scene occurs. More specifically, a human FIG. 1 approaches a human FIG. 2 from behind, performs an injury act for about ten seconds, and escapes out of the screen. Meanwhile, the human FIG. 2 crouches down and stands still at the same position.

Figure 2:
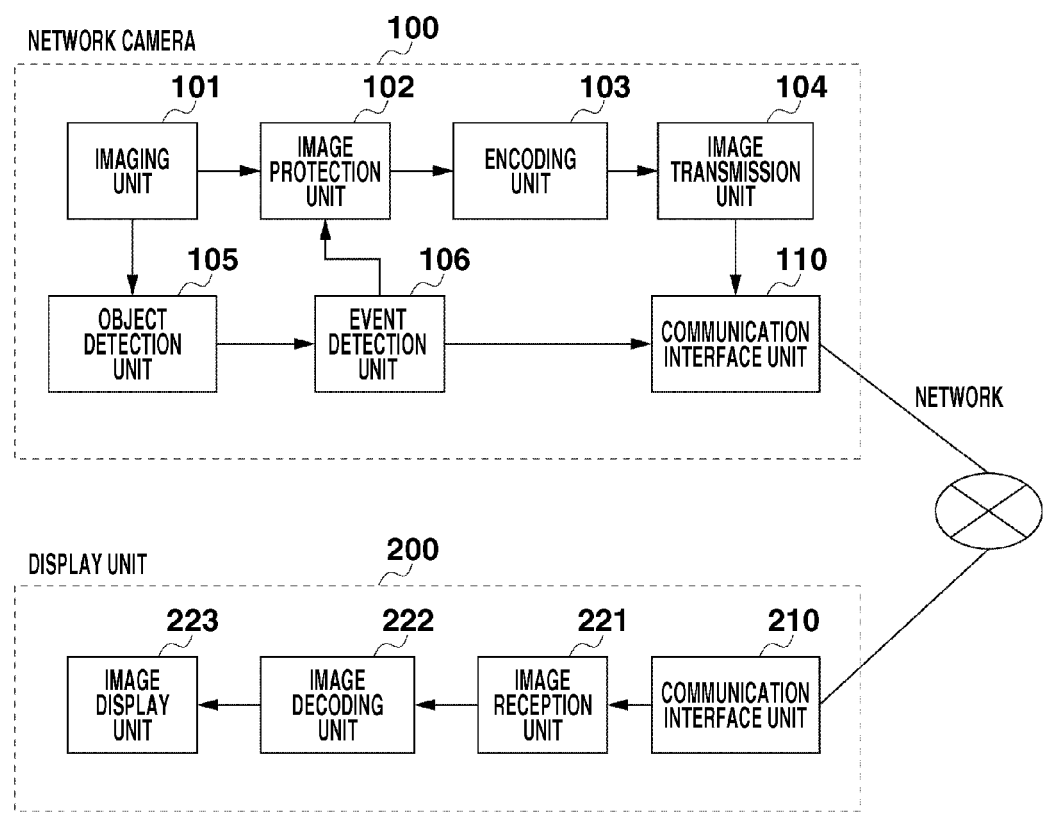
FIG. 2 illustrates an internal configuration of a network camera and a display unit.

Further, when the event detection unit 106 detects the occurrence of such an injury act, the change processing is canceled for both the human FIGS. 1 and 2. More specifically, the event detection unit 106 determines to make displayable on the display unit 200 the objects (human FIGS. 1 and 2) relevant to the injury act while the change processing is not applied by the image protection unit 102. In other words, the event detection unit 106 determines to make identifiable to the client (display unit) as an object under monitoring the human figures (human FIGS. 1 and 2) relevant to the injury act among unidentifiable objects (human figures) detected by the object detection unit 105.

As mentioned above, the event detection unit 106 according to the present exemplary embodiment can detect various events based on the situation of detecting a plurality of objects and human figures. Then, the event detection unit 106 cancels the change processing for the human figure relevant to the event to make it identifiable to the client.

The image protection unit 102 according to the present exemplary embodiment has been described based on a case where the change processing is applied to human figures among objects detected by the object detection unit 105. However, the change processing can be applied to any object other than human figures, and canceled for a human figure and an object relevant to an event. For example, the change processing is applied to a car license plate and a house doorplate irrelevant to an event to make them unidentifiable to the client, and canceled as to a car license plate and a house doorplate relevant to the event to make them identifiable to the client. This enables monitoring objects relevant to an event while protecting the privacy of objects irrelevant thereto.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-244830 filed Oct. 23, 2009, which is hereby incorporated by reference herein in its entirety.

What is claimed is:

1. An image processing apparatus for transmitting image data of a plurality of frames to a client, comprising:
   a memory;
   a processor coupled to the memory which executes the following:
   detecting an object in a frame;
   determining that a first object detected in a first frame should be unidentifiable at the client if the first object satisfies a predetermined condition;
   determining whether second and third objects detected in a second frame after the first frame are divided from the first object detected in the first frame;
   determining whether the second object detected in the second frame is an abandoned object in accordance with whether the second object stays in a predetermined range for a predetermined period of time;
   determining that the second object detected in the second frame should be identifiable at the client if the second object is not determined to satisfy the predetermined condition and that the third object detected in the second frame should be unidentifiable at the client if the third object is determined to satisfy the predetermined condition and the second object does not satisfy a condition to determine the second object as an abandoned object;
   determining whether the second and third objects are detected in a third frame after the second frame;
   determining whether the second object detected in the third frame is an abandoned object in accordance with whether the second object stays in the predetermined range for the predetermined period of time; and
   determining that the second object detected in the third frame should be identifiable at the client if the second object is not determined to satisfy the predetermined condition and that the third object detected in the third frame should be identifiable at the client if the second and the third objects are divided from the first object and the second object stays in the predetermined range for the predetermined period of time.

2. The image processing apparatus according to claim 1, further comprising:
   setting an area under detection in a frame, wherein the determination determines that the second object is an abandoned object if the second object is in the area under detection for the predetermined period of time.

3. The image processing apparatus according to claim 1, wherein change processing is not applied to an object that is determined to be identifiable at the client.

4. The image processing apparatus according to claim 1, further comprising:
transmitting to the client key information to make an object identifiable at the client.

5. The image processing apparatus according to claim 1, wherein it is determined that the third object detected in the second frame should be unidentifiable at the client if the third object is determined to satisfy the predetermined condition, the second and the third objects detected in the second frame are divided from the first object detected in the first frame and the second object does not satisfy the condition to determine the second object as an abandoned object, and
determining that the third object detected in the third frame should be identifiable at the client if the third object is determined to satisfy the predetermined condition, the second and the third objects are divided from the first object and the second object stays in the predetermined range for the predetermined period of time.

6. An image processing method performed by an image processing apparatus for transmitting image data of a plurality of frames to a client, the image processing method comprising:
detecting an object in a frame;
determining that a first object detected in a first frame should be unidentifiable at the client if the first object satisfies a first predetermined condition;
determining whether second and third objects detected in a second frame after the first frame are divided from the first object detected in the first frame;
determining whether the second object detected in the second frame is an abandoned object in accordance with whether the second object stays in a predetermined range for a predetermined period of time;
determining that the second object detected in the second frame should be identifiable at the client if the second object is not determined to satisfy the predetermined condition and that the third object detected in the second frame should be unidentifiable at the client if the third object is determined to satisfy the first predetermined condition and the second object does not satisfy a condition to determine the second object as an abandoned object;
determining whether the second and third objects are detected in a third frame after the second frame;
determining whether the second object detected in the third frame is an abandoned object in accordance with whether the second object stays in the predetermined range for the predetermined period of time; and
determining that the second object detected in the third frame should be identifiable at the client if the second object is not determined to satisfy the predetermined condition and that the third object detected in the third frame should be identifiable at the client if the second and the third objects are divided from the first object and the second object stays in the predetermined range for the predetermined period of time.

7. The image processing method according to claim 6, further comprising:
setting an area under detection in a frame,
wherein the determination determines that the second object is an abandoned object if the second object is in the area under detection for the predetermined period of time.

8. The image processing method according to claim 6, wherein change processing is not applied to an object that is determined to be identifiable at the client.

9. The image processing method according to claim 6, wherein it is determined that the third object detected in the second frame should be unidentifiable at the client if the third object is determined to satisfy the predetermined condition, the second and the third objects detected in the second frame are divided from the first object detected in the first frame the second object does not satisfy a condition to determine the second object as an abandoned object, and
determining that the third object detected in the third frame should be identifiable at the client if the third object is determined to satisfy the predetermined condition, the second and the third objects are divided from the first object detected and the second object stays in the predetermined range for the predetermined period of time.

10. A non-transitory computer-readable storage medium storing a program executable by a computer for transmitting image data of a plurality of frames to a client, the program comprising:
detecting an object in a frame;
determining that a first object detected in a first frame should be unidentifiable at the client if the first object satisfies a predetermined condition;
determining whether second and third objects detected in a second frame after the first frame are divided from the first object detected in the first frame;
determining whether the second object detected in the second frame is an abandoned object in accordance with whether the second object stays in a predetermined range for a predetermined period of time;
determining that the second object detected in the second frame should be identifiable at the client if the second object is not determined to satisfy the predetermined condition and that the third object detected in the second frame should be unidentifiable at the client if the third object is determined to satisfy the predetermined condition and the second object does not satisfy a condition to determine the second object as an abandoned object;
determining whether the second and third objects are detected in a third frame after the second frame;
determining whether the second object detected in the third frame is an abandoned object in accordance with whether the second object stays in the predetermined range for the predetermined period of time; and
determining that the second object detected in the third frame should be identifiable at the client if the second object is not determined to satisfy the predetermined condition and that the third object detected in the third frame should be identifiable at the client if the second and the third objects are divided from the first object and the second object stays in the predetermined range for the predetermined period of time.

11. The computer readable storage medium according to claim 10, further comprising:
setting an area under detection in a frame,
wherein the determination determines that the second object is an abandoned object if the second object is in the area under detection for the predetermined period of time.

12. The computer readable storage medium according to claim 10, wherein change processing is not applied to an object that is determined to be identifiable at the client.

13. The computer readable storage medium according to claim 10, wherein it is determined that the third object detected in the second frame should be unidentifiable at the client if the third object is determined to satisfy the predetermined condition, the second and the third objects detected in the second frame are divided from the first object detected in the first frame and the second object does not satisfy the condition to determine the second object as an abandoned object, and determining that the third object detected in the third frame should be identifiable at the client if the third object is determined to satisfy the predetermined condition, the second and the third objects are divided from the first object and the second object stays in the predetermined range for the predetermined period of time.

\* \* \* \* \*